Feb. 21, 1950 T. T. N. BUCHER 2,498,526

BALANCED MODULATION

Filed Feb. 19, 1948

INVENTOR
THOMAS T.N. BUCHER
BY Harry Lanick
ATTORNEY

Patented Feb. 21, 1950

2,498,526

UNITED STATES PATENT OFFICE 2,498,526

BALANCED MODULATION

Thomas T. N. Bucher, Moorestown, N. J., assignor to Radio Corporation of America, a corporation of Delaware Application February 19, 1948, Serial No. 9,598

8 Claims. (Cl. 332—64)

In this application, I disclose a new and improved balanced modulation system.

By the term "balanced modulator" I mean a system wherein carrier is applied to the modulator and in the presence of a selected modulation magnitude adjustment is such that there is little or no output. When the modulation magnitude is varied, the state of balance is upset and output is developed the envelope of which follows the modulation magnitude. Where the adjustment is such that balance is attained in the presence of carrier and zero magnitude or no modulation the carrier is suppressed and side band energy output only is developed. In the embodiment developed, balance in the presence of no modulation is provided.

The balanced modulator of my invention is used to modulate video pulses being developed for modulation of pulse type signals such as dealt within radar applications.

In the description which follows, reference will be made to pulse waves which are modulated. However, the invention is not limited to such application but is applicable in the usual balanced modulation systems such as carrier suppression systems in single side band transmission, various automatic direction finder applications, carrier telephony work, automatic frequency control circuits in FM and carrier exalted systems wherein the carrier is first suppressed and a phase corrected carrier is later inserted.

The general purpose of my invention is to provide a simple circuit for producing balanced modulation of pulse energy or carrier currents of various types.

In its broadest aspect, my invention involves use of a constant cathode current tube of the pentode type with anode and cathode outputs opposed and substantially balanced or compensated when the pulses or carrier voltages are on the control grid to determine the amount of cathode current. Modulation applied to the #3 grid alters the distribution of current from the cathode to the anode and other tube electrodes to cause variation in the anode voltage from its carrier value to unbalance the output and accomplish modulation.

Figure 1:
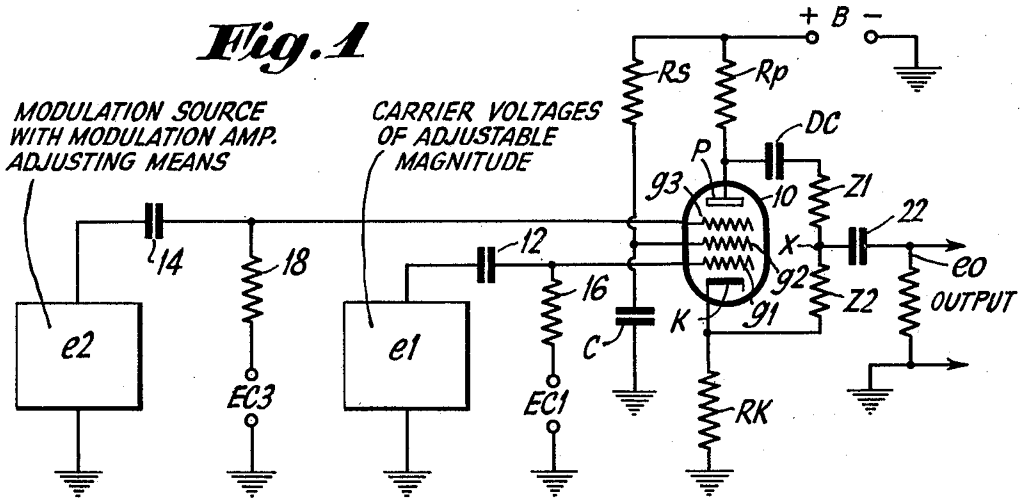

In describing my invention in detail, reference will be made to the attached drawing wherein Fig. 1 illustrates by circuit elements and circuit element connections, a balanced modulator arranged in accordance with my invention.

Figure 2:
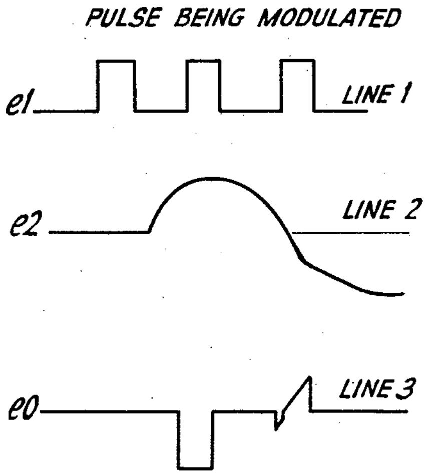
Figure 3:
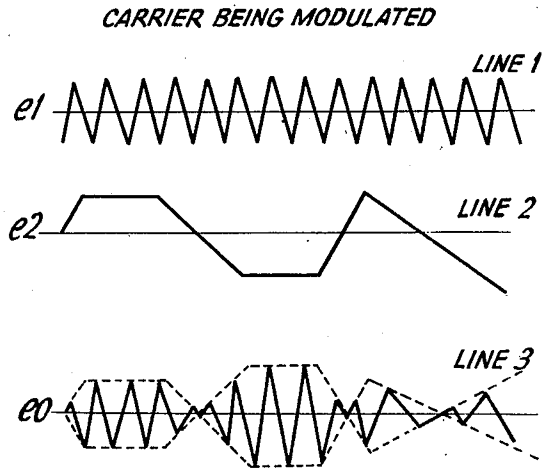

Figs. 2 and 3 illustrate by current curves operation of the balanced modulator of Fig. 1.

In Fig. 1, an electron discharge device 10 having cathode K and a plurality of grids labeled $g1$, $g2$ and $g3$ and an anode P is provided. The electrodes $g1$ and $g3$ control the electron stream, the electrode $g1$ having principal control of the total amount of cathode current which flows. The electrode $g3$ has control over the amount of the cathode current which reaches the anode P. The total cathode current is substantially constant and when the amount reaching the anode is changed by control of electrode $g3$ the current distribution is to the other electrodes in the tube such as, for example, electrode $g2$. In other words, the grid $g3$ controls division of the cathode current between the anode and another electrode, such as, for example, the screening grid $g2$. Pentode tubes of any type are satisfactory for use here, examples of such tubes being the 6SA7, 6A8 and 6AS6. In the embodiment being described, a 6AS6 tube is used.

The anode P is connected to the positive terminal of a direct current source by resistor RP while the cathode K is connected to ground and negative terminal of this source by a cathode resistor RK. An output circuit is connected between the plate P and cathode K and comprises a direct current blocking condenser DC and two impedances Z1 and Z2. A source of recurring potentials, such as pulses or carrier currents, is represented by $e1$ and coupled by capacitor 12 between the control grid $g1$ and the cathode. The grid $g2$ is maintained at an electropositive potential by resistor RS. Capacitor C serves to by-pass the resistor RS, thereby maintaining the potential of $g2$ relative to ground at a substantially constant value, when the current to $g2$ fluctuates. Modulating potentials represented at $e2$ are coupled by capacitor 14 to the grid $g3$. Bias as desired is supplied by resistors 16 and 18 to the grids $g1$ and $g3$ from sources EC1 and EC3 having their positive terminals connected to ground.

The impedances Z1 and Z2 may be of any type so long as the impedance is properly assigned and proportioned to provide a balance. For example, in one application of this invention in which the voltage $e1$ was composed of pulses of a duration of the order of one or two microseconds and repeated at an audio frequency rate, and $e2$ was a signal in the audio range lower than the repetition frequency, RK was made 1500 ohms, RP, 2800 ohms, and Z1 and Z2 were two portions of a 10,000 ohm potentiometer, the tap being so located as to provide balanced operation. If, however, operation were over a narrower band of frequencies than is necessary for pulses, resonant circuit elements could usefully be used for Z1 and Z2. It is however, possible, without departing from the scope of the invention, to use two impedances of any sort which will produce the balanced condition.

In operation, assume that carrier or pulse energy is present at e1 and on the grid g1. Assume also that modulating potentials are absent or if present at e2, are in the carrier or zero modulation condition. Then the values of RP, RK, Z1 and Z2 are so adjusted with reference to the gain of the tube 10 that the voltages developed across RP as they appear at point X are substantially equal to the voltages developed across RK as the latter appear at point X. Then, by virtue of the phase inverting effect of the circuits as operated, these voltages of the frequency of source e1 cancel and there is no output. This may be considered the carrier condition. Thus, although voltages of the frequency of e1 are repeated on the anode P and cathode K and in the output circuit Z1, Z2 the connections are such that these potentials oppose in Z1 and Z2 and substantially compensate so that the potential at the point X between Z1 and Z2 designated herein as e0 is constant being of zero A.-C. magnitude. Now, when modulation takes place at e2 by variation of the magnitude of potentials therein, the grid g3 potential varies to vary the current flowing to the plate P and through resistor RP thereby giving rise to a higher or lower magnitude voltage across RP to upset the balance of the load circuit Z1, Z2 and produce A.-C. output voltage at e0.

So long as the variations are small enough to maintain linearity, the output represents a balanced modulation. The impedances Z1, Z2 are chosen so that the current which flows through them into the cathode resistor RK produces negligible voltage variations in the said resistor RK. I prefer to choose Z1 and Z2 in this manner for convenience in design and adjustment. However, even when this current is not negligible, a balance will generally be possible by suitable choice of Z1 and Z2. Balance may be assured by isolating the balancing impedances Z1 and Z2 (or Z2 alone) by means of vacuum tubes.

In Fig. 2, the voltage e1 is represented in line 1 as positive going pulses. The modulation e2 is represented in line 2 and the modulated output e0 appearing at point X between Z1 and Z2 is represented in line 3. When current of sine wave form is being modulated, the carrier current applied at e1 is represented in line 1 of Fig. 3, the modulation applied at e2 is represented in line 2 of Fig. 3 while the modulated output e0 is represented in line 3 of Fig. 3. The base lines of e1 and e2, Figs. 2 and 3 may be zero, or they may have some other suitable value. For example, it may be preferable to adjust the base line to give an optimum bias on one or both of the grids g2, g3. The base line of e0 will be determined by the D.-C. value of cathode current resistor RK. The capacitors 12 and 14 separate the D.-C. level on the grids from the applied A.-C. voltages e1 and e2. The bias sources EC3 and EC1, produce suitable biases for the tube. Under these conditions, the base lines of e1 and e2 are of no consequence, as the base lines of the voltages applied to grids g1 and g2 are adjustable by EC1 and EC3. Further the output base line will tend to be zero, as the D.-C. value of cathode current in resistor RK is removed by the insertion of the unmarked condenser.

What is claimed is:

1. In a modulation system, an electron discharge tube having a cathode, an anode, another electron receiving electrode, a first grid the potential on which controls the total cathode current of the tube and a second grid the potential on which controls the distribution of the current in the tube to the anode and other electrode, a source of voltage to be modulated coupled to said first grid, a source of modulation potentials coupled to said second grid, and an output circuit coupled to the anode and cathode in such a manner that voltages therein oppose, the opposed voltages being substantially equal for a selected value of said modulation potentials.

2. In an amplitude modulation system, a tube having an anode, a cathode and at least two grids, one of which controls the total cathode current flow and another of which controls the distribution of the current flow to the tube electrodes, a source of carrier current coupled to one grid, a source of modulation coupled to another grid, an anode circuit impedance, a cathode circuit impedance, an output circuit wherein the voltages developed across said impedances oppose, and biasing circuits for said grids such that the opposed voltages cancel when said modulation is at a base value representing zero modulation.

3. In a modulation system, an electron discharge device having at least an anode, a cathode and two grids, one of which controls the current in the device and another of which controls the distribution of the current in the device, a source of voltage to be modulated coupled to one grid, a source of modulation voltage coupled to another grid, output impedances coupled to the anode and cathode, and load coupled to said impedances in such a manner that potentials developed therein in the absence of voltage on one of said grids oppose and substantially cancel.

4. In a balanced modulation system, an electron discharge tube of the type wherein cathode current during operation is substantially constant, said tube having an anode, a cathode and at least two grids, an anode circuit including an impedance coupling the positive terminal of a source of potential to the anode and an impedance coupling the negative terminal of the source to said cathode, a source of energy the magnitude of which varies at a recurring rate coupled to one grid of said tube, a source of modulating potentials coupled to another grid of said tube, and an output circuit coupled to the anode and cathode of said tube in such a manner that potential variations at the anode and cathode oppose therein and substantially compensate when said modulating potentials are at a base value representing zero modulation.

5. In a balanced modulation system, an electron discharge tube of the type wherein cathode current during operation is substantially constant, said tube having an anode, a cathode and two grids, a direct current anode circuit comprising a resistor connecting the positive terminal of a source of potential to the anode and a resistor connecting the negative terminal of the source to said cathode, a source of energy the magnitude of which varies at a recurring rate coupled to one grid of said tube, a source of modulating potentials coupled to the other grid of said tube, and an output circuit connected between the anode and cathode of said tube in such a manner that potential variations at the anode and cathode oppose and substantially compensate when said modulating potentials are at a base value representing zero modulation.

6. A modulation system as recited in claim 5 wherein said tube is a pentode, said one grid is the control grid and said other grid is the suppressor grid.

7. In a modulation system, an electron discharge device having at least an anode, a cathode and two grids, one of which controls the current in the device and another of which controls the distribution of current in the device, means coupled to one grid for supplying thereto the voltage to be modulated, means coupled to another grid for supplying thereto a modulation voltage, an impedance network coupled between said anode and cathode, and a load coupled to said impedance network at a point intermediate its ends, said point being so chosen that potentials in said network oppose and balance each other at said point in the absence of voltage on one of said grids.

8. In a balanced modulation system, an electron discharge tube of the type wherein cathode current during operation is substantially constant, said tube having an anode, a cathode and two grids, a direct current anode circuit comprising a resistor connecting the positive terminal of a source of potential to the anode and a resistor connecting the negative terminal of the source to the cathode, means coupled to one grid of said tube for supplying thereto energy the magnitude of which varies at a recurring rate, means coupled to the other grid of said tube for supplying thereto modulating potentials, an impedance network coupled between the anode end of the first-named resistor and the cathode end of the second-named resistor, and an output circuit coupled to said network at a point intermediate its ends, said point being so chosen that potential variations at the anode and cathode oppose and balance each other at said point when said modulating potentials are at a base value representing zero modulation.

THOMAS T. N. BUCHER.

REFERENCES CITED

The following references are of record in the file of this patent:

UNITED STATES PATENTS

| Number | Name | Date |
|---|---|---|
| 2,163,939 | Dillenberger | June 27, 1939 |
| 2,211,939 | Steimel et al. | Aug. 20, 1940 |